(12) United States Patent
Raghupathy et al.

(10) Patent No.: US 10,194,395 B2
(45) Date of Patent: Jan. 29, 2019

(54) SYSTEMS AND METHODS FOR LOW-POWER LOCATION DETERMINATION USING TERRESTRIAL SIGNALS

(71) Applicant: NextNav, LLC, Sunnyvale, CA (US)

(72) Inventors: Arun Raghupathy, Bangalore (IN); Subramanian S. Meiyappan, San Jose, CA (US)

(73) Assignee: NextNav, LLC, Sunnyvale, CA (US)

( * ) Notice: Subject to any disclaimer, the term of this patent is extended or adjusted under 35 U.S.C. 154(b) by 0 days.

(21) Appl. No.: 15/487,219

(22) Filed: Apr. 13, 2017

(65) Prior Publication Data

US 2017/0311264 A1  Oct. 26, 2017

Related U.S. Application Data

(60) Provisional application No. 62/327,303, filed on Apr. 25, 2016.

(51) Int. Cl.
| | | |
|---|---|---|
| *H04W 52/02* | (2009.01) | |
| *H04B 17/373* | (2015.01) | |
| *G01S 5/02* | (2010.01) | |
| *G01S 5/10* | (2006.01) | |
| *H04B 7/26* | (2006.01) | |
| *H04B 17/318* | (2015.01) | |

(52) U.S. Cl.
CPC ....... *H04W 52/0245* (2013.01); *G01S 5/0221* (2013.01); *G01S 5/10* (2013.01); *H04B 17/373* (2015.01); *H04W 52/0254* (2013.01); *H04B 7/2643* (2013.01); *H04B 17/318* (2015.01); *Y02D 70/142* (2018.01); *Y02D 70/144* (2018.01); *Y02D 70/164* (2018.01); *Y02D 70/449* (2018.01)

(58) Field of Classification Search
CPC ....... G01S 5/0221; G01S 5/10; H04B 17/318; H04B 17/373; H04B 7/2643; H04W 52/0245; H04W 52/0254; Y02D 70/142; Y02D 70/144; Y02D 70/164; Y02D 70/449
See application file for complete search history.

(56) References Cited

U.S. PATENT DOCUMENTS

| | | | | |
|---|---|---|---|---|
| 5,553,076 A * | 9/1996 | Behtash | ................ | H04W 28/26 370/311 |
| 5,982,742 A * | 11/1999 | Leung | .................. | H04B 7/2612 370/213 |
| 6,151,310 A * | 11/2000 | Dent | ....................... | H01Q 1/246 370/330 |
| 6,172,970 B1 * | 1/2001 | Ling | ..................... | H04B 7/0814 370/347 |
| 6,421,357 B1 * | 7/2002 | Hall | ........................ | H04L 1/004 341/60 |

(Continued)

*Primary Examiner* — Lewis West

(57) ABSTRACT

Reducing power consumption of a receiver in association with estimating the receiver's position using ranging signals. Systems and methods may determine power reduction strategy information, identify a power reduction strategy using the determined power reduction strategy information, and place one or more modules of the receiver into a reduced power state using the identified power reduction strategy. The power reduction strategy may result in powering off different circuitry of the receiver at different times, and under different circumstances.

16 Claims, 8 Drawing Sheets

(56) References Cited

U.S. PATENT DOCUMENTS

| | | | | |
|---|---|---|---|---|
| 2003/0058830 | A1* | 3/2003 | Schmidt | H04B 7/2653 370/347 |
| 2006/0280141 | A1* | 12/2006 | McBeath | H04L 29/12839 370/329 |
| 2008/0253327 | A1* | 10/2008 | Kohvakka | H04W 16/14 370/330 |
| 2009/0238063 | A1* | 9/2009 | Park | H04B 7/0845 370/208 |
| 2010/0202327 | A1* | 8/2010 | Mushkin | H04B 1/713 370/280 |
| 2012/0182180 | A1* | 7/2012 | Wolf | G01S 5/021 342/357.29 |
| 2013/0012135 | A1* | 1/2013 | Ruohonen | H04B 1/406 455/63.1 |
| 2014/0266912 | A1* | 9/2014 | Sendonaris | G01S 19/28 342/458 |
| 2016/0205529 | A1* | 7/2016 | Oren | H04W 8/005 370/336 |
| 2018/0027494 | A1* | 1/2018 | Huang | H04W 76/10 370/311 |

* cited by examiner

SYSTEMS AND METHODS FOR LOW-POWER LOCATION DETERMINATION USING TERRESTRIAL SIGNALS

RELATED APPLICATIONS

This application relates to the following related application(s): U.S. Pat. Appl. No. 62/327,303, filed Apr. 25, 2016 entitled SYSTEMS AND METHODS FOR LOW-POWER LOCATION DETERMINATION USING TERRESTRIAL SIGNALS. The content of each of the related application(s) is hereby incorporated by reference herein in its entirety.

BACKGROUND

Signals from satellite systems like the Global Positioning System (GPS) are widely used for determining the position of receiver (e.g., a mobile device operated by a user). Power levels of signals from satellite systems, however, are very weak and often have undesired (e.g. low) signal-to-noise ratios (SNRs). As a consequence, receivers processing those signals are required to remain active for long periods to receive (e.g., acquire and track) the signals to determine the position of the receiver. Long active periods of a circuitry causes high power consumption resulting in battery drain on battery-operated receivers (e.g., mobile phones). In contrast to satellite systems, terrestrial signals from terrestrial transmitters can be received at fairly strong signal levels at the receiver. Using terrestrial signals to determine the position of the receiver provides opportunities to reduce power consumption at the receiver when determining the receiver's position. Various power saving strategies when using terrestrial signals are described herein.

DETAILED DESCRIPTION

Use of satellite signaling to determine a user's position is widely deployed, where such signaling is received from multiple satellites by a receiver operated by a user, and then used to estimate the distances between the receiver and those satellites that are used to estimate the receiver's position during the well-known process of trilateration. However, power levels of signaling from satellite systems are often very weak, and using such signaling to estimate the receiver's position causes significant drain on the battery life of the receiver because the receiver processing the signaling is often required to remain active for long periods to acquire and track the signaling.

It is possible to use terrestrial signaling from terrestrial systems to estimate a receiver's position. The power levels of such terrestrial signaling, relative to satellite signaling, are stronger and can have better signal strengths (e.g. higher signal-to-noise ratios). Using terrestrial signals to estimate the position of the receiver provides opportunities to reduce power consumption at the receiver when computing an estimate of the receiver's position. Various power saving strategies are described below.

The power consumption in a receiver's integrated circuit (IC) implemented in silicon that supports terrestrial positioning can be broadly partitioned into digital and analog/RF power consumption. Digital power saving can be achieved through clock gating, which saves dynamic power, or turning OFF power to certain sections of the circuitry, which is usually called as power gating and which saves static or leakage power on top of dynamic power. Analog or RF power saving can involve power gating of some or all components in the receiver's IC. Clock gating is a standard approach where the clock to circuitry is turned off so there is no switching (e.g., dynamic) power consumption. Clock gating is controlled conceptually using a 'AND' function of a gating control signal and the clock. When the gating control signal is a logical 1, the clock to the circuitry controlled by the 'AND' gate is ON (e.g., passed through) and when the gating signal is logical 0, the clock is gated OFF (e.g., clock is blocked). Power gating is a standard approach where the power supply to the circuit is turned OFF using a switch. A control signal controlled by software or hardware is used to control the power switch's ON and OFF positions.

With strong signal levels, any receiver that is processing terrestrial signals used for estimating the receiver's position can employ the power save strategies described below, specifically taking advantage of any time-shared nature of a wireless channel(s) used to transmit the terrestrial signals from respective transmitters. Some terrestrial systems use pre-defined slotting mechanisms for signal transmission (e.g., TDMA), and overlap multiple transmissions on the same time slot in certain cases.

Figure 1:
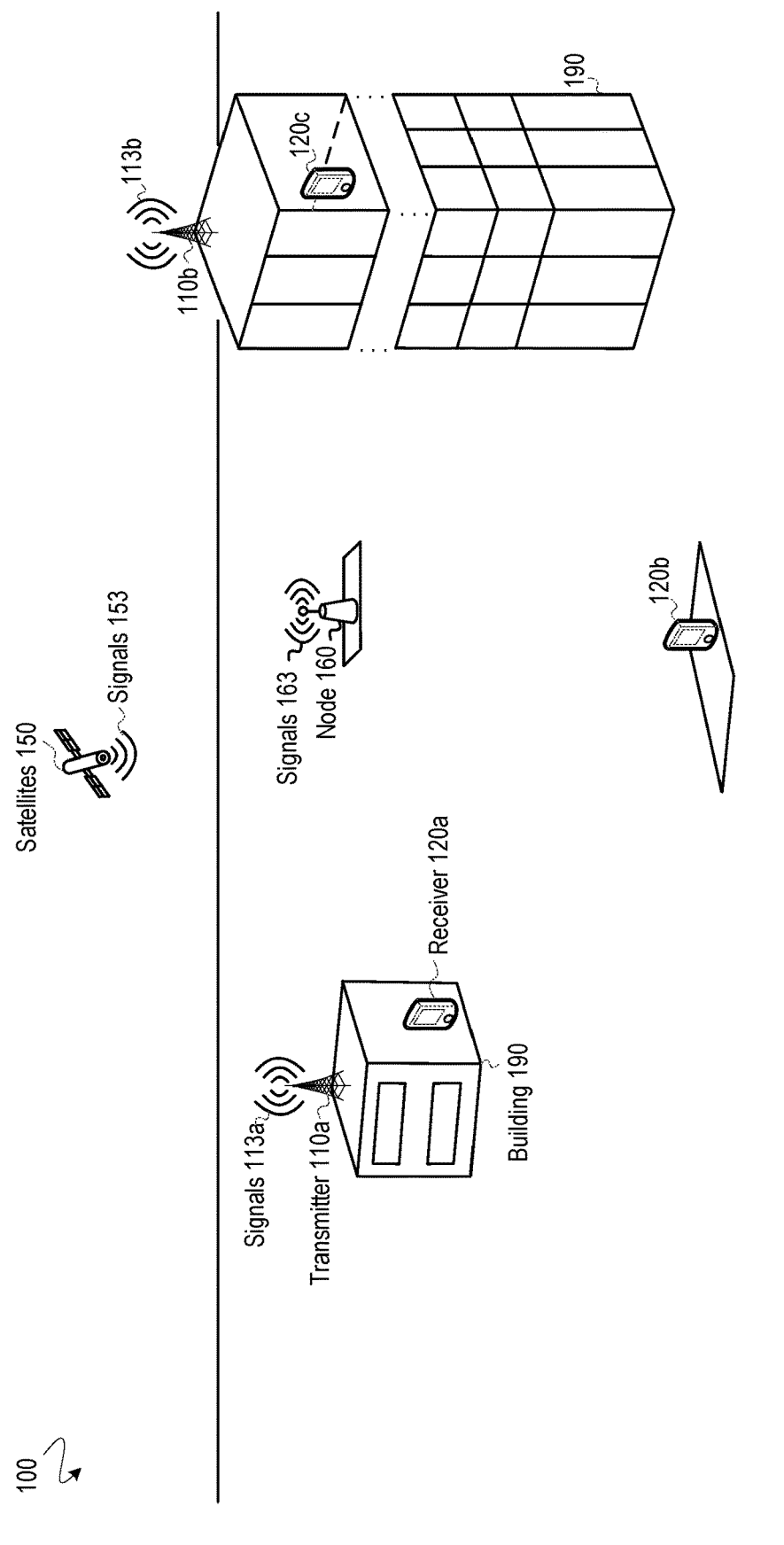
FIG. 1 illustrates an operational environment for low-power position determination using terrestrial signals.

FIG. 1 illustrates an operational environment 100 for estimating a position of a receiver using terrestrial ranging signals while managing power consumption of circuitry at a receiver. The operational environment contains a network of terrestrial transmitters 110 and any number of receivers 120. The transmitters 110 and the receivers 120 may be located at different altitudes or depths that are inside or outside various buildings or other structures 190. Signals 113, 153 and 163 are exchanged between the receivers 120 and the transmitters 110, satellites 150, and/or other nodes 160 using known wireless or wired transmission technologies. The transmitters 110 may transmit the signals 113 (e.g., ranging signals) using one or more common multiplexing parameters—e.g. time slot, pseudorandom sequence, frequency offset, and/or other. Each of the receivers 120 may use the signals 113, 153 and 163 to estimate a position (e.g., latitude, longitude, and/or altitude) of that receiver using known techniques, such estimating distances to particular transmitters 110 using the travel time of the ranging signals, and then using the estimated distances along with known locations of the particular transmitters 110 during trilateration to compute an estimated position of that receiver.

Figure 2:
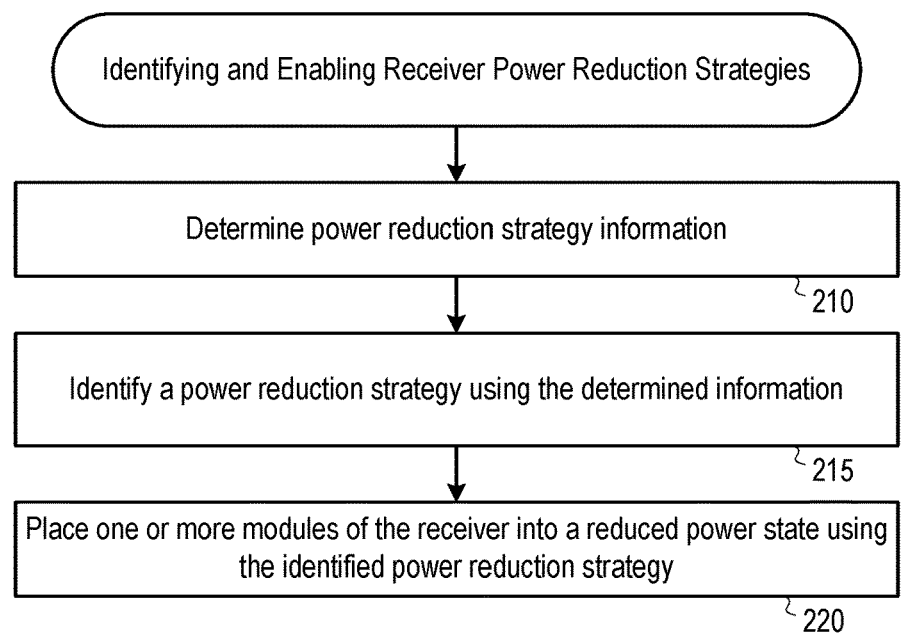
FIG. 2 illustrates steps of identifying and enabling receiver power reduction strategies.

FIG. 2 illustrates a process for identifying and enabling receiver power reduction strategies. The steps include: determining power reduction strategy information (e.g., SNR(s) of signal(s) received at a receiver, TDMA time-slot schedules of signal(s), slot duration(s) used for transmission of signal(s) by transmitter(s), a dilution of precision value associated with subsets of transmitters, estimated position update rate(s) for software application(s) of the receiver, detected motion or non-motion of a receiver, an indication that a signal jammer is or is not present in a radio environment of a receiver, transmitter assistance data, or other information) (step 210). The steps further include: identifying a power reduction strategy using the determined power reduction strategy (step 215); and placing one or more modules of the receiver into a reduced power state using the identified power reduction strategy (step 220). By way of example, transmitter assistance data may include information about each transmitter 110 that is likely to be visible to the receiver 120 based on a rough position estimate of the receiver 120, including: the PRN code used by the transmitter 110, a frequency of transmission for the transmitter 110, a frequency offset for the transmitter 110 (e.g., used to reduce cross-correlation), trilateration information for the transmitter 110 (e.g., location coordinates of the transmitter 110, a reference pressure at a reference altitude that was computed using a pressure measured by the transmitter 110), and/or other information. In some embodiments, the transmitter assistance data makes decoding un-necessary, and therefore makes short integrations that do not cover the entire slot possible.

Figure 3:
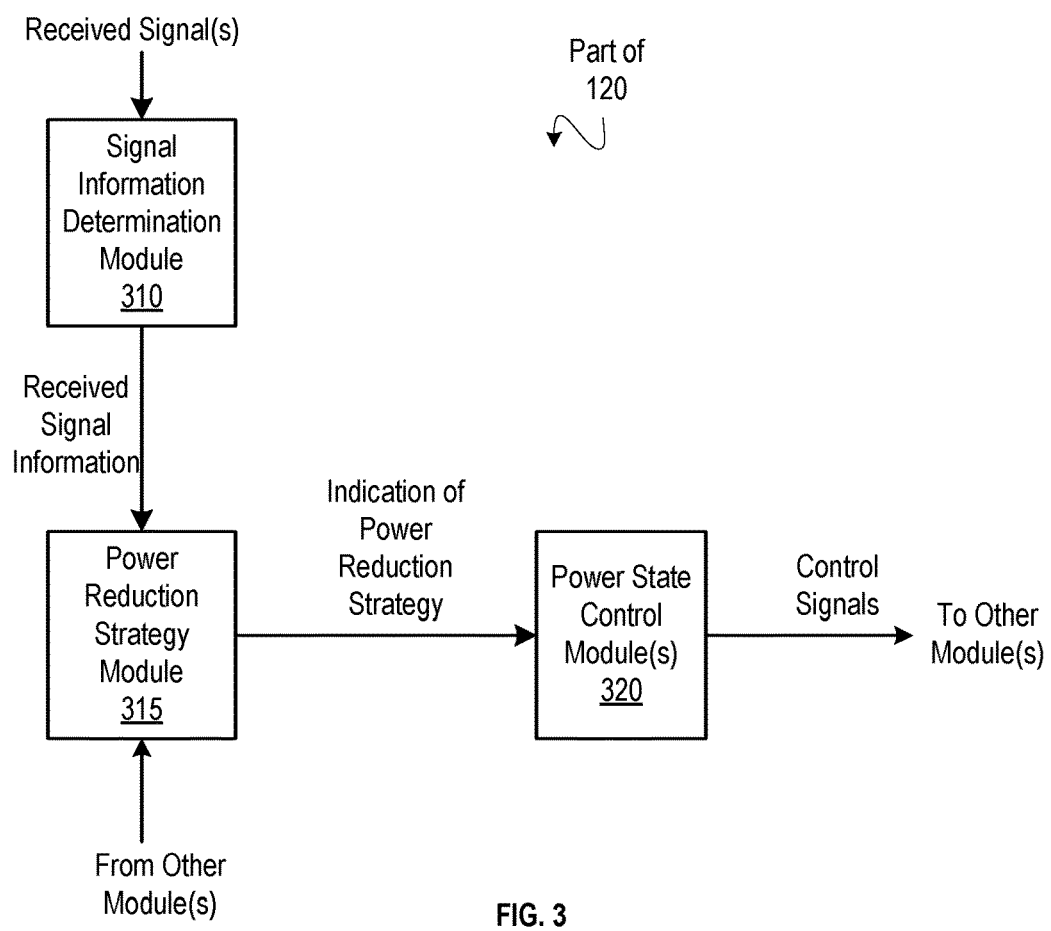
FIG. 3 illustrates one embodiment of an apparatus used for identifying and enabling receiver power reduction strategies.

FIG. 3 illustrates one embodiment of an apparatus that is used for identifying and enabling receiver power reduction strategies. The apparatus includes various modules that are each operable to carry out different steps of FIG. 2. The apparatus may, in one embodiment, be a receiver 120. As shown, the various modules include a signal information determination module 310 operable to perform step 210 (e.g., one or more known signal processing modules to measure a signal strength like SNR or a Received Signal Strength Indicator (RSSI), one or more known signal processing modules to measure the quality of a range measurement using information derived from a correlation function extracted from a matched filter like the multipath profile of the signal, one or more known processing modules to identify a TDMA time-slot schedule of signals and slot durations from assistance data or other data, one or more known signal processing modules and other known processing modules to determine a dilution of precision value for subsets of transmitters, one or more known signal processing modules to process received signals and extract locations of transmitters from assistance data in the received signals, one or more known processing modules to identify estimated position update rates for software applications from storage or other sources of such update rates, one or more inertial sensors to detect motion or non-motion, one or more known signal processing modules to detect signals of a signal jammer, or other modules). The modules also include: a power reduction strategy module 315 operable to perform step 215 (e.g., one or more known processing modules); and power state control module(s) 320 operable to perform step 220 (e.g., one or more known processing modules). The signal information determination module 310 is coupled to the power reduction strategy module 315; and the power reduction strategy module 315 is coupled to the power state control module(s) 320. The signal information determination module 310 receives signals from transmitters, and sends received signal information to the power reduction strategy module 315, which sends an indication of power reduction strategy to the power state control module(s) 320, which outputs control signals to other modules that control the power state of those other modules.

Figure 4:
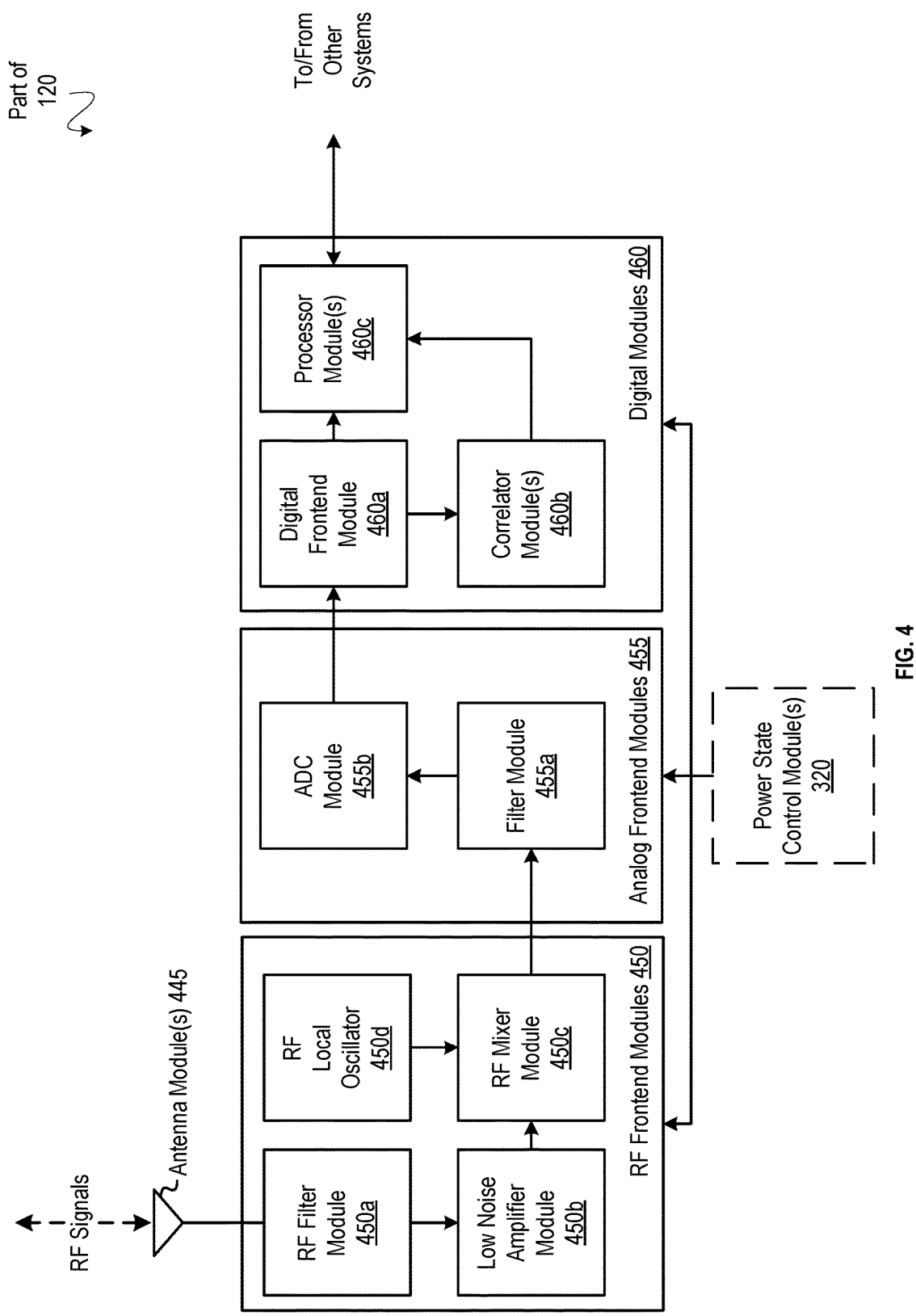
FIG. 4 illustrates one embodiment of an apparatus used for identifying and enabling power reduction strategies.

By way of example, FIG. 4 illustrates one embodiment of an apparatus used for identifying and enabling power reduction strategies. The apparatus includes various modules that are each operable to carry out different steps of FIG. 2. The apparatus may, in one embodiment, be a receiver 120.

As shown, the various modules include: antenna modules 445; RF frontend modules 450; analog frontend modules 455; and digital modules 460. The antenna modules 445 are coupled to the RF frontend modules 450; the RF frontend modules 450 are coupled to the analog frontend modules 455; and the analog frontend modules 455 are coupled the digital modules 460. The RF frontend modules 450, the analog frontend modules 455, and the digital modules 460 may be included among the "other modules" to which control signals are sent from the power state control module(s) 320 to control the power state of those other modules.

Example module topologies are shown within the RF frontend modules 450, the analog frontend modules 455, and the digital modules 460. The RF frontend modules 450 may include: a RF filter module 450a; a low noise amplifier module 450b; a RF mixer module 450c; and a RF local oscillator 450d. The analog frontend modules 455 may include: a filter module 455a; and an ADC module 455b. The digital modules 460 may include: digital frontend module 460a; correlator module(s) 460b; and processor module(s) 460c. Possible flow of circuitry signaling is illustrated among these modules by arrows. Other flows of signaling are possible. One skilled in the art will appreciate that there are many other suitable topologies. For instance, in another embodiment, there could be more modules (e.g. more RF filter modules 450a that could be coupled to the output of a low noise amplifier (LNA) module 450b).

Powering OFF After Expiration of Sub-Duration of Transmission Time Slot

In spread spectrum systems, longer integration means higher processing gain which also means higher integrated signal-to-noise ratio (SNR). In this context, SNR can be considered in the broader meaning of representing a quality metric that is directly proportional to the quality of a range measurement in a trilateration system. For example, one measure of SNR can be the SNR of the largest multipath signal component, another measure of SNR can be the SNR of the earliest arriving path detected by the receiver (which is important in a ranging system), another measure of SNR can be proportional to ratio of the strength of the earliest arriving path to the sum of the strengths of the some or all of the other multipaths (e.g., a subset of multipaths can be a set of paths within a certain distance threshold of the earliest arriving path considered to be close enough to limit resolvability), or another measure of SNR can be proportional to ratio of the strength of the earliest arriving path to the sum of the strength of other multipaths and noise. Power saving is accomplished by reducing integration ON time for a given transmitter in a given slot when a high enough SNR of that transmitter's signal permits shorter integration. For example, when a receiver processes a signal from a terrestrial transmitter, and if the receiver determines that the estimated signal level (e.g., SNR) of the signal is above an acceptable threshold, the receiver can process the signal for a limited period of time (e.g., 10 millisecond (ms) processing may be sufficient for a slot duration of 100 ms), and then turn OFF circuitry (e.g., including RF, analog and digital sections of the circuitry) that the receiver does not need for the rest of slot duration (e.g., the remaining 90 ms). Turning OFF circuitry may be accomplished by clock gating or power gating. However, in some embodiments, when a receiver processes a signal from a terrestrial transmitter, and if the receiver determines that the estimated signal strength (e.g., SNR) of the signal is not above an acceptable threshold, the receiver processes the signal for more than the limited period of time (e.g., more than 10 ms) before turning OFF circuitry that the receiver does not need for any remaining portion of slot duration. Thus, decision-making on when to turn OFF the receiver's circuitry during a slot can be dynamically made by assuming that a required quality of a range measurement from a signal is met when an SNR of the signal exceeds an acceptable threshold. The acceptable threshold may be chosen to be fixed or adaptive for each signal such that the quality of a resulting range measurement is acceptable. For example, an acceptable threshold of 30 dB SNR may be used in a receiver environment where multipath resolvability is required (e.g., based on a priori knowledge of the geographical environment or morphology of the receiver). In more benign environments, acceptable threshold of 25 dB SNR may be used. Alternately, the threshold may be selected based on the channel estimate (e.g., as determined by a matched filter correlation function) for a particular transmitter as seen by the receiver.

When different transmitters transmit signals in the same slot, decision-making as to when to turn ON or turn OFF the receiver's circuitry during that slot can be dynamically made upon detecting that a minimum number of signals for that slot have SNRs above an acceptable threshold, and then processing those signals for a limited period of time during the slot before turning OFF circuitry that the receiver does not need for other signals with SNRs below the acceptable threshold. In one embodiment, the minimum number of signals is one signal.

Figure 5:
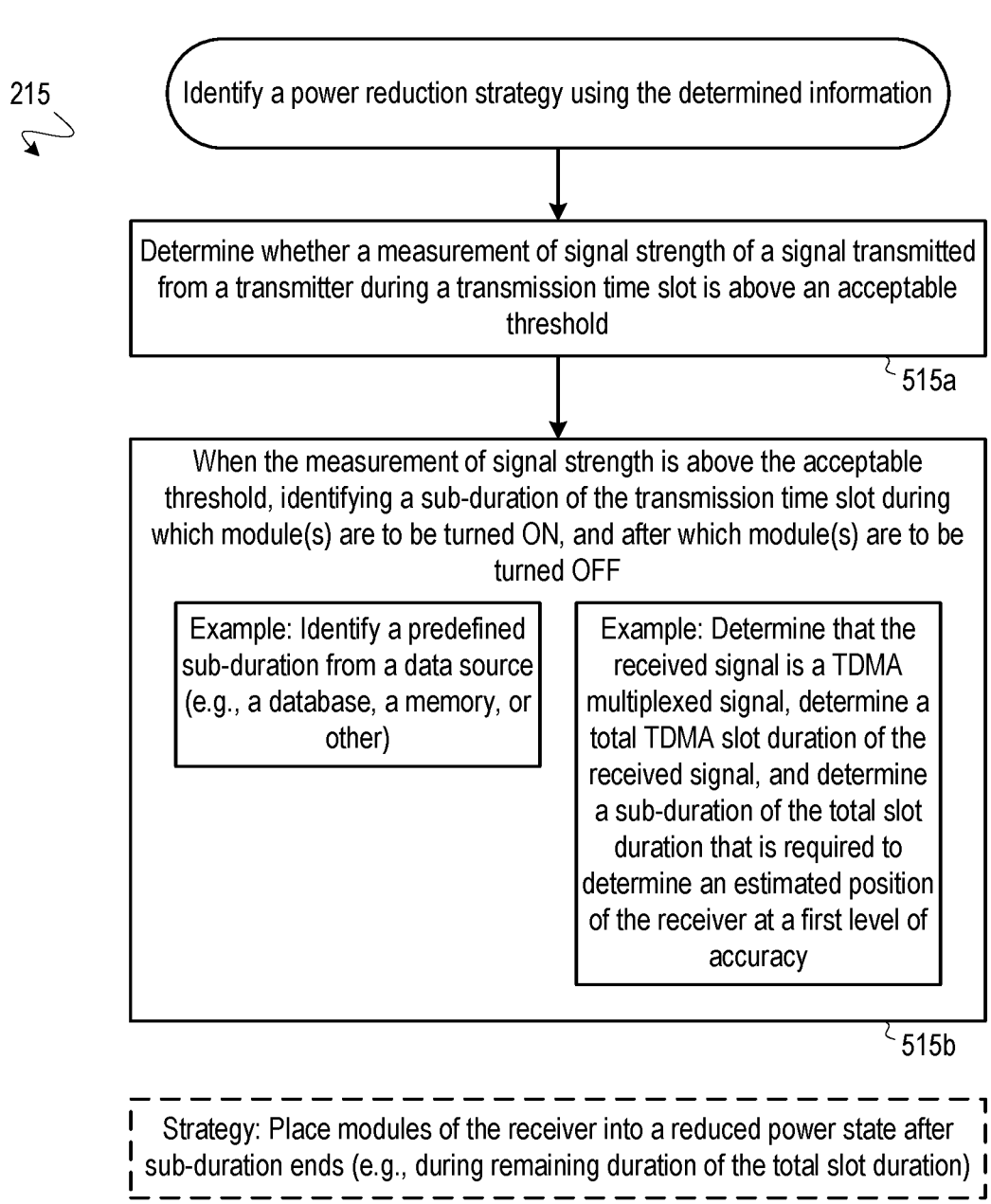
FIG. 5 illustrates an embodiment for identifying a power reduction strategy using determined power reduction strategy information that includes a measurement of signal strength of a signal.

FIG. 5 illustrates an embodiment for identifying a power reduction strategy using determined power reduction strategy information that includes a measurement of signal strength of a signal. The steps of FIG. 5 may occur as part of step 215 of FIG. 2. The steps of FIG. 5 include: determining whether a measurement of signal strength (e.g., SNR) of a signal transmitted from a transmitter during a transmission time slot is above an acceptable threshold (e.g., by comparing the measurement of the signal strength with a predefined threshold level of strength) (step 515a); and when the measurement of signal strength is above the acceptable threshold, identifying a sub-duration of the transmission time slot during which module(s) are to be turned ON, and after which module(s) are to be turned OFF (step 515b). In one embodiment of FIG. 5, the identified strategy of placing modules of the receiver into a reduced power state places the modules into the reduced power state after the sub-duration ends within the transmission time slot (e.g., for subsequent signals transmitted from the transmitter during the transmission time slot). The process of FIG. 5 may be repeated for more than one transmitter.

In one embodiment of step 515b, a predefined sub-duration (e.g., 10 ms, or predefined percentage of a total slot duration) is identified from a data source (e.g., a database, a memory, or other).

Another embodiment of step 515b includes the following sub-steps: determining that the received signal is a TDMA multiplexed signal (e.g., where the receiver already knows that the transmitter transmits TDMA signals, or otherwise determines that the signal is a TDMA signal); determining a total TDMA slot duration of the received signal (e.g., where the receiver already knows that transmissions by the transmitter 110 have a known slot duration, or otherwise determines the slot duration); and determining a sub-duration of the total slot duration that is required to determine an estimated position of the receiver at a first level of accuracy.

In yet another embodiment of step 515b, the sub-duration is determined based on a target minimum SNR required for that transmitter, which may be determined adaptively or statically based on the target range measurement quality, where range measurement quality is directly proportional to SNR. An integration time corresponds to processing gain. With a total slot duration of integration, the SNR is SNR_full_slot. If this SNR_full_slot>SNR_threshold (e.g., 30 dB), then power saving can be obtained using shorter integration times than the total slot duration of integration for the slot. The integration time can be reduced by a factor of k such that SNR computed with shorter integration time is greater than SNR_threshold. For example, the integration time can be reduced by a factor k such that $k \leq 10^{\wedge}[(SNR\_full\_slot-SNR\_threshold)/10]$.

In one embodiment of FIG. 5, when a first signal's SNR is not above the acceptable threshold, the process of FIG. 5 is not performed relative to the first signal, and is instead performed relative to a second signal with an SNR that is above the acceptable threshold.

Powering OFF for Transmissions that were not Made by an Identified Subset of Transmitters If the receiver determines that, over certain slots, it has received signals from an adequate number of transmitters necessary for providing a position solution (e.g., computing an estimated position), the receiver may turn OFF circuitry during remaining time slots. The adequate number may be based on a predefined number n of transmitters, based on a particular level of precision that may or may not be requested by the user, based on an application in operation on the receiver, or based on another consideration. For example, in a 10-slot, 100 ms per slot system, if the receiver determines that signaling for four out of the 10 slots can satisfactorily estimate user position, the receiver can turn OFF circuitry for six of the slots to possibly save up to 60% power during the 600 ms of those six slots. The number four may be a predefined number, a number needed to compute an estimated position at a first level of accuracy relative to true position, or another number.

The slots in which the receiver is turned OFF may be contiguous slots or slots that are not contiguous. For example, the receiver could turn ON circuitry during contiguous slots 3, 4, 5, and 6, or non-contiguous slots 1, 4, 7 and 9, while turning OFF circuitry during other slots. When slots are contiguous, the receiver may decide to perform power gating as opposed to just clock gating. The techniques disclosed herein can be applied to any slotted system, independent of whether the system has static slotting or pseudorandom slotting among transmitters. The transmitter network can be designed (e.g., in terms of allocating slots to transmitters) such that receivers in certain target areas need to only listen to minimum number of slots, thus minimizing power consumption of receivers using power saving strategies.

Based on accuracy requirements of a software application (e.g., a static mapping application, a navigation application, or other), circuitry can be turned OFF when a desired accuracy is achieved with a limited subset of transmitters in certain slots.

Figure 6:
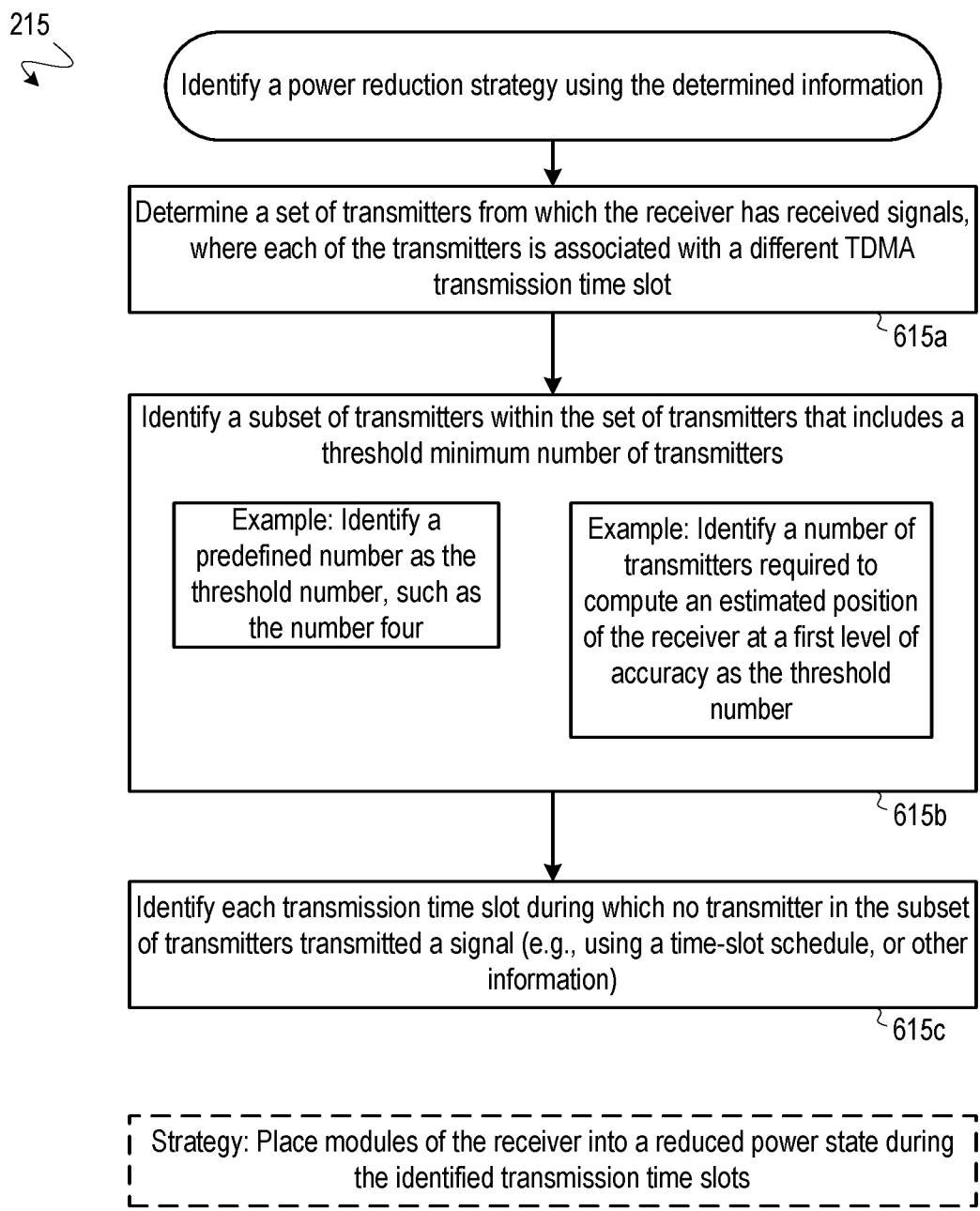
FIG. 6 illustrates an embodiment for identifying a power reduction strategy using determined power reduction strategy information that includes a time-slot schedule of signals transmitted from transmitters.

FIG. 6 illustrates an embodiment for identifying a power reduction strategy using determined power reduction strategy information that includes a time-slot schedule of signals transmitted from transmitters. The steps of FIG. 6 may occur as part of step 215 of FIG. 2. The steps of FIG. 6 include: determining a set of transmitters from which the receiver has received signals, where each of the transmitters is associated with a different transmission time slot (e.g., each transmitted a respective signal using a particular TDMA transmission time slot) (step 615*a*); identifying a subset of transmitters within the set of transmitters that includes a threshold minimum number of transmitters (e.g., by (step 615*b*); and identifying each transmission time slot during which no signal from any transmitter in the subset of transmitters is transmitted (e.g., using a time-slot schedule, or other information) (step 615*c*). In one embodiment of FIG. 6, the identified strategy of placing modules of the receiver into a reduced power state places the modules into the reduced power state during the identified transmission time slots that are not used by any transmitter of the subset of transmitters (e.g., for subsequent signals transmitted during the identified transmission time slots).

In one embodiment of step 615*b*, a predefined number is identified as the threshold number, and the subset only includes a number of transmitters that is equal to the predefined number. In different implementations, the predefined number may vary, and may include four or other numbers as desired.

In another embodiment, step 615*b* is replaced by the step of identifying a subset of transmitters that when used for trilateration provide an estimated position of the receiver that meets a position quality threshold condition while minimizing the number of unique slots occupied by the subset of transmitters that must be monitored. Note that there are at least a couple of ways to select the minimum number of unique slots occupied by the transmitters that must be monitored, including a dilution of precision (DOP) criterion and/or a position quality metric criterion. One approach is to compute a metric such as DOP with various subsets of transmitters (e.g., by brute force), then select the subset of transmitters that minimizes the number of slots used (compared to other subsets) while still meeting a DOP threshold criterion (that is met by the other subsets), and then reduce power to or turn OFF circuitry during slots that are not included in a subset of slots used by the selected subset of transmitters. Another approach is to use range measurements derived from signals of the transmitters to determine subsets of transmitters that provided signals used to derive range measurements that achieve a required position quality metric that meets a position quality threshold condition determined from requirements of an application, then select the subset of transmitters that minimizes the number of slots used (compared to other subsets) while still meeting the position quality threshold condition (that is met by the other subsets), and then reduce power to or turn OFF circuitry during slots that are not included in a subset of slots used by the selected subset of transmitters. One method of determining a position quality metric is a confidence circle or ellipse within which the position estimate is expected, as described in U.S. Pat. No. 8,130,141, issued Mar. 6, 2012. When the position quality metric computed using range measurements derived from signals transmitted by a given subset of transmitters meets a position quality threshold condition (e.g., is estimated to be less than x units of measurements from the true position of the receiver, where x is 10, 20 or 50 meters), then the subset is considered acceptable. Various acceptable subsets of transmitters are compared, and the subset that requires the receiver to be ON for minimum number of slots or time is selected over other subsets. Note that a set of range measurements per individual transmitter can also be used for the selected instead of a single range measurement per transmitter (e.g., a range measurement per transmitter once every second assuming a slot repetition period of 1 second can be collected for a few seconds to form a set of measurements). Another approach for selecting a subset of transmitters selects transmitters along different directions as described in U.S. patent application Ser. No. 14/207,650, published Sep. 18, 2014.

One embodiment of the step of identifying a subset of transmitters that when used for trilateration provide an estimated position of the receiver that meets a position quality threshold condition while minimizing the number of unique slots occupied by the subset of transmitters that must be monitored includes the sub-steps of: identifying a first subset of transmission time slots used by a first subset of transmitters to transmit a first subset of signals used to derive a first subset of range measurements that were used to compute a first estimated position of the receiver that meets a position quality threshold condition; identifying a second subset of transmission time slots used by a second subset of transmitters to transmit a second subset of signals used to derive a second subset of range measurements that were used to compute a second estimated position of the receiver that meets the position quality threshold condition; and identifying the first subset of transmission time slots or the second subset of transmission time slots as a selected subset of transmission time slots by (1) identifying the first subset of transmission time slots as the selected subset of transmission time slots when the first subset of transmission time slots is less than the second subset of transmission time slots, (2) identifying the second subset of transmission time slots as the selected subset of transmission time slots when the second subset of transmission time slots is less than the first subset of transmission time slots, and (3) identifying either the first subset of transmission time slots or the second subset of transmission time slots as the selected subset of transmission time slots when the first subset of transmission time slots is equal to the second subset of transmission time slots. The identified power reduction strategy then places one or more modules into a reduced power state during transmission time slots that are not included in the selected subset of transmission time slots.

Powering OFF for Transmissions that were not Made by Transmitters with Preferred DOP The receiver may use a set of signals of transmitters for which the computed dilution of precision (DOP) at the estimated position of the receiver is used to determine its power reduction strategy at any given time. In one embodiment, a set of transmitters for which the computed DOP value is below a threshold DOP level is used. Note that DOP is expected to be directly proportional to a position quality.

Specifically, the receiver can determine an optimal subset of transmitters occupying a minimum number of slots (e.g., four slots) that is able to provide a DOP value below a threshold DOP value while minimizing power consumption. For example, in one embodiment, a DOP condition is used such that modules are turned ON during transmission time slots used by only n transmitters (e.g., n=1) in each of m regions (e.g., m=4) in the transmitter network—e.g., n transmitters in a first region, n transmitters in a second region, . . . , and n transmitters in an mth region), where the regions are located in different directions (e.g., along different ranges of azimuthal angles) from an initial estimated position of the receiver. The modules are turned OFF during transmission time slots for other transmitters not included in the n transmitters.

In one embodiment, the modules are turned ON during transmission time slots of signals from the n transmitters in a region, but turned OFF during transmission time slots of signals from other transmitters in the region when the n transmitters or their signals are preferred over the other transmitters or their signals. In one implementation of this embodiment, the n transmitters or their signals are preferred over the other transmitters or their signals when it is determined that each of the n transmitters are closer than the other transmitters to an initial estimate of the receiver's position, when it is determined that each of the n transmitters are located at higher altitudes than the other transmitters, and/or when another condition based on relative positions of transmitters in the region is determined to have been met. In another implementation of this embodiment, the n transmitters or their signals are preferred over the other transmitters or their signals when measurements of signal strength of the signals from the n transmitters is determined to be higher than measurements of signal strength of the signals from the other transmitters. In yet another implementation of this embodiment, the n transmitters or their signals are preferred over the other transmitters or their signals when it is determined that estimated multipath error in estimated ranges that are computed using the signals from the n transmitters is less than estimated multipath error in estimated ranges that are computed using the signals from the other transmitters.

Figure 7:
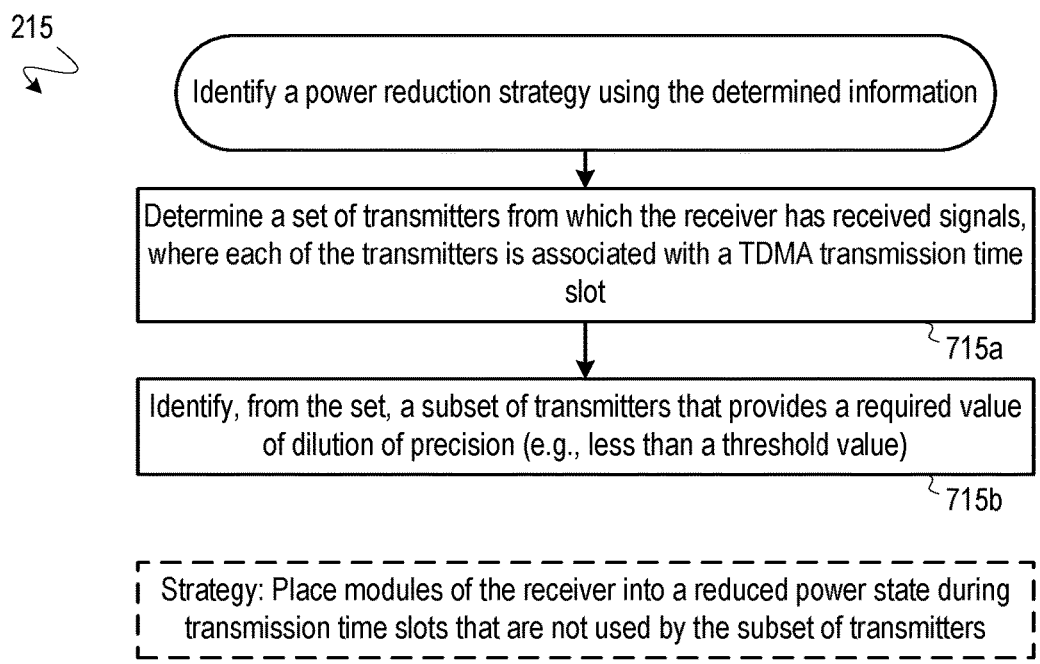
FIG. 7 illustrates an embodiment for identifying a power reduction strategy using determined power reduction strategy information that includes a value of dilution of precision associated with a subset of transmitters from a set of transmitters.

FIG. 7 illustrates an embodiment for identifying a power reduction strategy using determined power reduction strategy information that includes a value of dilution of precision associated with a subset of transmitters from a set of transmitters. The steps of FIG. 7 may occur as part of step 215 of FIG. 2. The steps of FIG. 7 include: determining a set of transmitters from which the receiver has received signals, where each of the transmitters uses a TDMA transmission time slot, and in some embodiments use the same transmission time slot as another transmitter (step 715a); and identifying, from the set, a subset of transmitters that produce less than a threshold value of DOP (e.g., where the threshold value of DOP is 1.5) (step 715b). The identified subset may include transmitters that use the same slot so as to minimize power consumption by turning OFF power to modules during more slots than would be possible if each transmitter in the identified subset used a different slot. In one embodiment, the identified strategy of placing modules of the receiver into a reduced power state places the modules into the reduced power state during transmission time slots that are not used by the subset of transmitters (e.g., during transmission time slots used by transmitters that are not in the subset of transmitters).

Powering OFF for Transmissions by Transmitters That are Farther Away

In moving or other dynamic scenarios, presence or knowledge of static transmitters can be used to save power. For example, the receiver can predict which transmitters (or even satellites) will be visible or not visible under such scenarios, or which transmitters will transmit signals that can be or cannot be received by the receiver above acceptable power levels (e.g. SNR).

For example, if an estimated position of the receiver is known a priori, a list of transmitters that are expected to be visible (and/or not visible) or that are expected to transmit signals that can (and/or cannot) be received above acceptable power levels can be determined using assistance data (e.g., locations of transmitters). Based on this list, the receiver can determine a power reduction strategy to turn ON and turn OFF circuitry based on whether signals from particular transmitters can and/or cannot be received at the estimated position (e.g., during assigned slots for those signals), or whether signals from particular transmitters can and/or cannot be received above acceptable power levels at the estimated position (e.g. SNR). Thus, the receiver can avoid power drain from searching for signals that may be unavailable or originating from a distance that is known to produce power levels (e.g. SNR) below acceptable thresholds.

The estimated position of the receiver may be known a priori using various approaches—e.g., using raw ranging data derived from signals received from transmitters to determine a coarse estimated position, using hybrid approaches, using an estimated position derived using satellite signals, using the location of a beacon in a local area network that is detected by the receiver or that detects the receiver, using a previous location of the receiver that has optionally been adjusted using an inertial sensor of the receiver, or other approaches known in the art.

Figure 8:
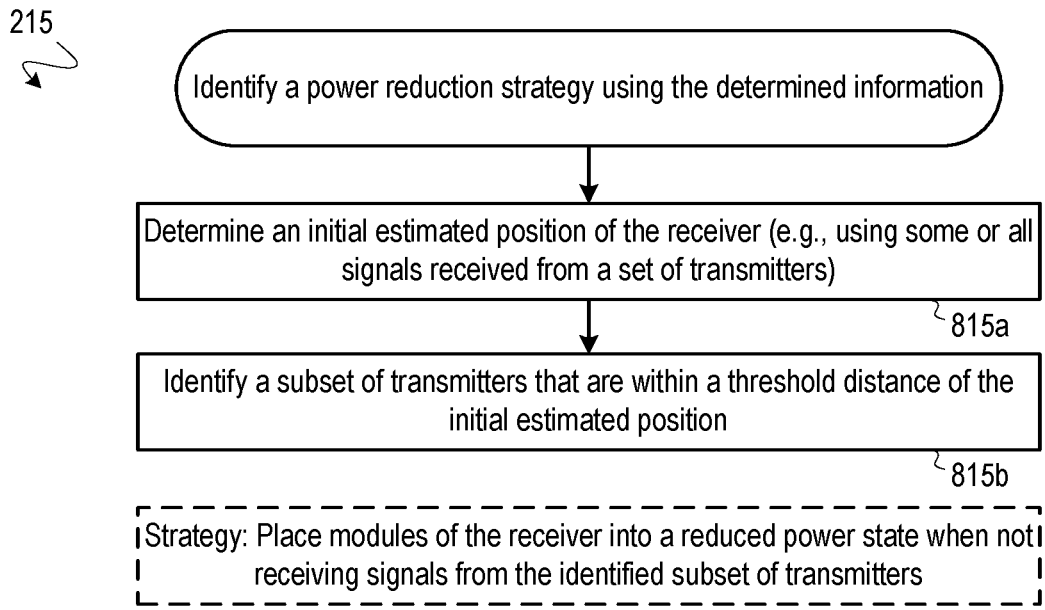
FIG. 8 illustrates an embodiment for identifying a power reduction strategy using determined power reduction strategy information that includes locations of transmitters.

FIG. 8 illustrates an embodiment for identifying a power reduction strategy using determined power reduction strategy information that includes locations of transmitters, where signals from transmitters that are expected to be available at an estimated position of the receiver are used, or signals from transmitters that are expected to be received above acceptable power levels are used. The steps of FIG. 8 may occur as part of step 215 of FIG. 2. The steps of FIG. 8 include: determining an initial estimated position of the receiver (step 815a); and identifying, from the set of transmitters, a subset of transmitters that are within a threshold distance of the initial estimated position (step 815b). Using such a threshold range assumes that closer transmitters have better range quality (e.g., due to higher expected SNR) than the farther transmitters relative to the position of the receiver. In one embodiment of FIG. 8, the identified strategy of placing modules of the receiver into a reduced power state places the modules into the reduced power state when the receiver is not receiving signals from the identified subset of transmitters (e.g., during transmission time slots used by transmitters that are not in the identified subset).

In one embodiment of step 815b, the set of transmitters includes the closest n transmitters. In another embodiment of step 815b, the set of transmitters includes all transmitters with location coordinates that are within a distance d from the initial estimated position of the receiver.

Powering OFF in Between Times for Updating an Estimated Position

Based on requests from different mapping, navigation or other software applications for application-specific updates to the receiver's estimated position (e.g., an update of 1 second, 5 second, or other time period), circuitry can be turned OFF in between update times. Modules can be placed in a reduced power state (e.g., turning OFF between updates) independently of how the update rate is determined.

Figure 9:
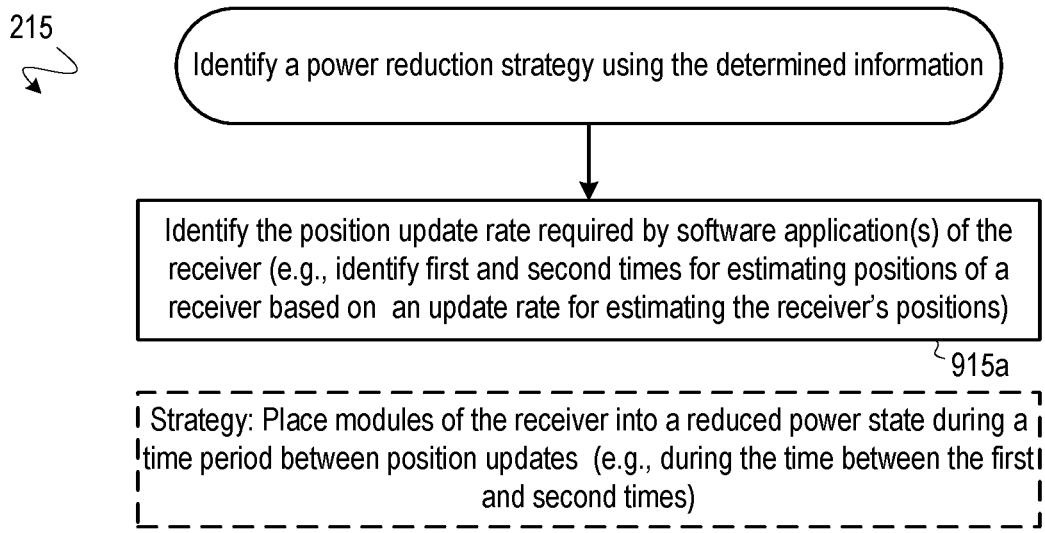
FIG. 9 illustrates an embodiment for identifying a power reduction strategy using determined power reduction strategy information that includes a position update rate for a software application of the receiver.

FIG. 9 illustrates an embodiment for identifying a power reduction strategy using determined power reduction strategy information that includes a position update rate for a software application that uses estimated positions of the receiver. The steps of FIG. 9 may occur as part of step 215 of FIG. 2. The steps of FIG. 9 include: identifying the position update rate required by a software application running on the receiver (e.g., identify first and second times for estimating positions of a receiver based on an update rate for estimating the receiver's positions) (step 915a). In one embodiment, the identified strategy of placing modules of the receiver into a reduced power state places the modules into the reduced power state during a time period between position updates (e.g., during the time between the first and second times).

Detecting Sensor Measurement Before Powering OFF for Transmissions that were not Made by an Identified Subset of Transmitters On receivers that process the position signals and also have other sensors—e.g., accelerometers, gyroscopes, compasses, atmospheric sensors (e.g., pressure, temperature, other), or other sensors—information from the sensors can be used by the receiver to manage power. For example, if the receiver knows that the user is not moving by the use of an accelerometer, the receiver does not have to dynamically search for transmitters and turn ON/OFF slots. Once a set of usable transmitter signals has been identified, the receiver can turn OFF the processing for other transmitters until it detects user motion again. As another example, if it is determined that a user is on an elevator, latitude and longitude can be fixed, the signal processing circuitry can be turned OFF, and the barometric pressure sensor can be turn ON for use in estimating altitude as a power reduction strategy.

Figure 10:
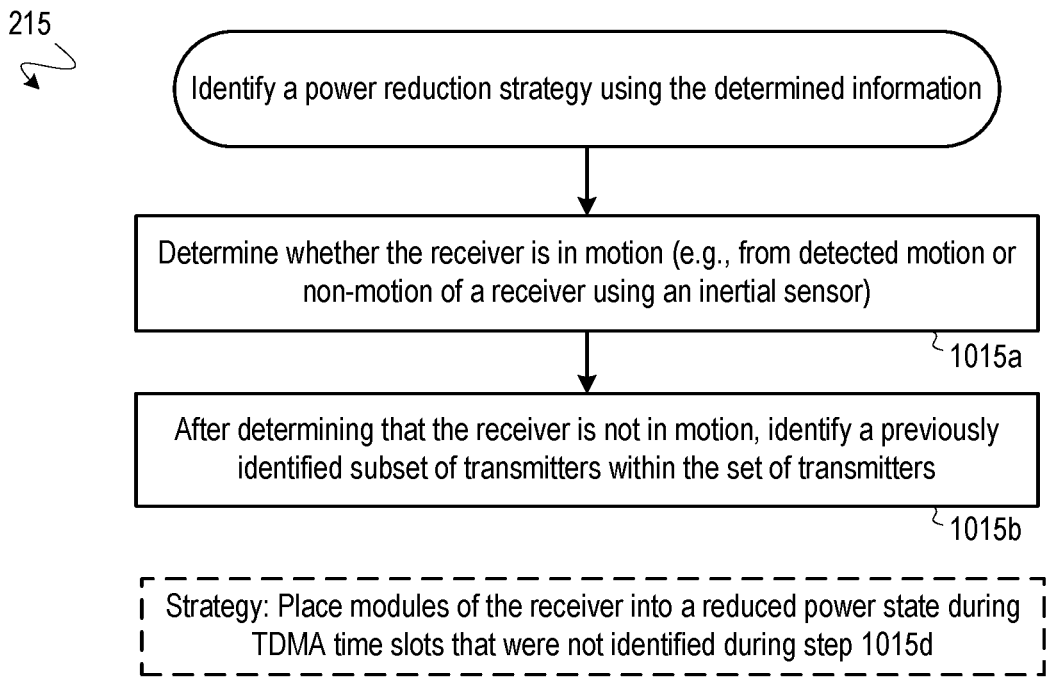
FIG. 10 illustrates an embodiment for identifying a power reduction strategy using determined power reduction strategy information that includes detected motion or non-motion of a receiver.

FIG. 10 illustrates an embodiment for identifying a power reduction strategy using determined power reduction strategy information that includes detected motion or non-motion of a receiver. The steps of FIG. 10 may occur as part of step 215 of FIG. 2. The steps of FIG. 10 include: determining whether the receiver is in motion (e.g., from detected motion or non-motion of a receiver using an inertial sensor) (step 1015a); and after determining that the receiver is not in motion, identifying a previously identified subset of transmitters within the set of transmitters (e.g., the subset from FIG. 6, FIG. 7, FIG. 8 or other subset) (step 1015b). In one embodiment of FIG. 10, the identified strategy of placing modules of the receiver into a reduced power state places the modules into the reduced power state during transmission time slots that are not used by any of the transmitters of the subset of transmitters. In one embodiment, when the receiver is in motion, the process of FIG. 10 is not performed.

Powering OFF when Jammers are Present

For static positions, if jammers are not detected, one can operate the RF frontend (such as a low noise amplifier) in a reduced linearity mode to save power. Based on detecting a jammer environment (e.g., where the receiver detects signals from a jammer), the receiver can reduce power by operating any or all of its analog RF circuitry (e.g., module 450 and/or module 455, or any of their sub-modules 450a-d and/or 455a-b) in low linearity or low dynamic range mode. Alternatively, a priori information about the presence of a jammer may be used to indicate that a jammer environment is detected. Similarly, lack of a priori information may be used to indicate that a jammer environment is not detected. Such information may include a pager tower location that is within a predefined distance from an initial estimated position of the receiver.

Figure 11:
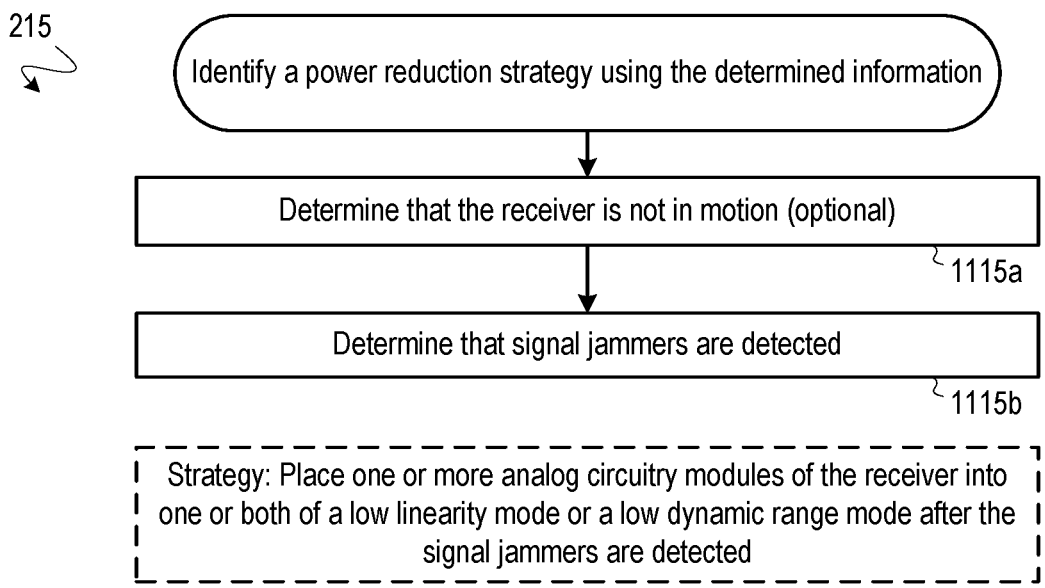
FIG. 11 illustrates an embodiment for identifying a power reduction strategy using determined power reduction strategy information that includes an indication that a signal jammer is or is not present in a radio environment of a receiver.

FIG. 11 illustrates an embodiment for identifying a power reduction strategy using determined power reduction strategy information that includes an indication that a signal jammer is or is not present in a radio environment of a receiver. The steps of FIG. 11 may occur as part of step 215 of FIG. 2. The steps of FIG. 11 include: optionally determining that the receiver is not in motion (optional step 1115a); and determining that signal jammers are detected (step 1115b). In one embodiment, the identified strategy of placing modules of the receiver into a reduced power state places one or more analog circuitry modules (e.g., an LNA/Mixer, an analog ADC, analog gain amplifier stages) of the receiver into one or both of a low linearity mode or a low dynamic range mode. In one embodiment when the receiver is in motion, step 1115b is not performed. In one embodiment when signal jammers are not detected, no power reducing strategy is performed.

In certain applications, it may not be desirable to turn OFF all of the RF circuitry. For example, it may not be desirable to turn OFF all of the RF circuitry when certain RF circuitry requires a time period for turning on or for settling that exceeds an acceptable amount of time, where the acceptable amount of time is predefined. In certain embodiments, an application may request that the some circuits such as an RF local oscillator be kept ON (e.g., for carrier phase tracking). In such cases, while some sub-sections of the circuitry is turned OFF for power saving, other sub-sections of the circuitry can be kept ON.

Turning all circuits ON or OFF at the same time may cause some power surges. In order to reduce those effects, the receiver may decide to stagger the turning ON or OFF of various sub-sections in a predefined (e.g., sequential) manner to provide a graceful turn ON or OFF process that avoids power surges.

Using a Real Time Clock (RTC) that consumes little power (or similar lower power consuming clock) to predict the time can aid in signal acquisition and therefore reduce complexity of search and power. Due to the static nature of the transmitters in a terrestrial system, the search space in time to be searched after an extended period of time is maintained using the RTC clock, which helps the usage of the RTC in aiding the search in a terrestrial system. In one embodiment, when the transmitters are members of a synchronized transmitter system, the time bias of the receiver is computed, which allows for computation of system time for the synchronized transmitter system. The RTC can be used for time-maintenance over the period of time that the receiver is OFF. The static nature of the transmitters means that the position of the transmitter need not be computed when finding the search space at a later time.

Hybrid measurements from multiple systems with terrestrial signals (e.g., OTDOA, WiFi, Bluetooth), and/or satellite signals (e.g., GPS) can be combined to estimate position and an appropriate power reduction strategy may be devised to turn ON/OFF appropriate circuitry at appropriate times based on application demand for timely updates and accuracy requirements. The power saving schedule for keeping the circuitry ON/OFF can be coordinated among the multiple systems.

Circuitry can be power gated or operate at a low-power bias point for RF power saving. Tunable analog filters and/or PGAs or sigma delta may be operated in a reduced power state. The specific ways of saving power at circuit level may use any techniques described herein.

In the embodiments described herein that place module(s) into a reduce power state, the modules that are placed into a reduce power state include, unless stated otherwise, any of module 450, module 455 and/or module 460, or any of the submodules 450a, 450b, 450c, 450d, 455a, 455b, 460a, 460b and/or 460c.

Certain implementations of FIG. 6 determine a number of transmitters needed to compute an estimated position at a certain level of accuracy, and certain implementations of FIG. 5 determine a sub-duration of a transmission time slot needed compute an estimated position at a certain level of accuracy (e.g., needed to acquire and track a signal during the transmission time slot). As is known, different levels of accuracy for an estimated position that is computed using trilateration can be expressed as a quality metric, where the quality metric represents an estimate of how accurate the estimated position is relative to the true position of the receiver (e.g., the estimated position is estimated to be within x units of measurement from the true position, where x=1, 5, 10, 20, 50, or another number, and the units of measurements are meters or another unit of measurement). Levels of accuracy may depend on various factors, including: geometric diversity of signal origins relative to the location of receiver (e.g., different signals being used to estimate ranges originated from different transmitters located along different azimuthal angles relative to the location of the receiver); dilution of precision provided by signals of transmitters that are used to compute the estimated position; a measurement quality of range estimates computed from ranging signals (e.g., in terms of how much multipath error is present in individual range estimates); length of time required for to acquire and track a signal; and/or other factors.

In some embodiments, the number of transmitters needed to compute an estimated position at a certain level of accuracy is a number of acquired/trackable signals transmitted by different transmitters that are needed to maintain a minimum quality metric for an estimated position computed using that number of acquired/trackable signals. If multiple groups of transmitters can maintain the minimum quality metric, then a preferred group can be selected, and then the receiver turns ON modules during transmissions by transmitters in the selected group and turns OFF those modules during transmissions by transmitters that are not in the selected group. The selected group may be a group that provides the most power reduction relative to other groups of transmitters.

Other Aspects

Methods of this disclosure may be implemented by hardware, firmware or software. One or more non-transitory machine-readable media embodying program instructions that, when executed by one or more machines, cause the one or more machines to perform or implement operations comprising the steps of any of the described methods are also contemplated. As used herein, machine-readable media includes all forms of statutory machine-readable media (e.g. statutory non-volatile or volatile storage media, statutory removable or non-removable media, statutory integrated circuit media, statutory magnetic storage media, statutory optical storage media, or any other statutory storage media). As used herein, machine-readable media does not include non-statutory media. By way of example, machines may include one or more computing device(s), processor(s), controller(s), integrated circuit(s), chip(s), system(s) on a chip, server(s), programmable logic device(s), other circuitry, and/or other suitable means described herein or otherwise known in the art.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving lower power consumption and/or increased processing efficiency. Method steps performed by a receiver can be performed by a server, or vice versa.

Systems comprising one or more modules that perform, are operable to perform, or adapted to perform different method steps disclosed herein are also contemplated, where the modules are implemented using one or more machines listed herein or other suitable hardware. When two things (e.g., modules or other features) are "coupled to" each other, those two things may be directly connected together, or separated by one or more intervening things. Where no lines and intervening things connect two particular things, coupling of those things is contemplated unless otherwise stated. Where an output of one thing and an input of another thing are coupled to each other, information (e.g., data and/or signaling) sent from the output is received by the input even if the data passes through one or more intermediate things. All information disclosed herein may be transmitted over any communication pathway using any protocol. Data, instructions, commands, information, signals, bits, symbols, and chips and the like may be represented by voltages, currents, electromagnetic waves, magnetic fields or particles, or optical fields or particles.

The words comprise, comprising, include, including and the like are to be construed in an inclusive sense (i.e., not limited to) as opposed to an exclusive sense (i.e., consisting only of). Words using the singular or plural number may also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

By way of example, transmitters described herein may include: antenna module(s) for exchanging signals with other systems; RF front end module(s) with circuitry components that are known or disclosed herein); processing module(s) for performing signal processing (e.g., generating signals for transmission at a selected time, using a selected frequency, using a selected code, and/or using a selected phase), methods described herein, or other processing; memory module(s) for providing storage and retrieval of data and/or instructions relating to methods of operation described herein that may be executed by the processing module(s); sensors module(s) for measuring conditions at or near the transmitter (e.g., pressure, temperature, humidity, wind, or other); and/or interface module(s) for exchanging information with other systems via other links other than a radio link. Signals transmitted by a transmitter may carry different information that, once determined by a receiver or a server, may identify the following: the transmitter; the transmitter's location (LLA); pressure, temperature, humidity, and/or other conditions at or near the transmitter.

A receiver may be in the form of a computing device (e.g., a mobile phone, tablet, laptop, digital camera, tracking tag), and may include any of: antenna module(s) for exchanging signals with other systems; RF front end module(s) with circuitry components that are known or disclosed herein; processing module(s) for signal processing of received signals to determine position information (e.g., times of arrival or travel time of received signals, atmospheric information from transmitters, and/or location or other information associated with each transmitter), for using the position information to compute an estimated position of the receiver, for performing methods described herein, and/or for performing other processing; memory module(s) for providing storage and retrieval of data and/or instructions relating to methods of operation described herein that may be executed by the processing module(s) or other module(s); sensor module(s) for measuring environmental conditions at or near the receiver (e.g., pressure, temperature, humidity, wind, other), which may be compared to the same environmental conditions at or near transmitters to determine the altitude of the receiver; other sensor module(s) for measuring other conditions (e.g., acceleration, velocity, orientation, light, sound); interface module(s) for exchanging information with other systems via other links other than a radio link; and/or input/output module(s) for permitting a user to interact with the receiver. Processing by the receiver can also occur at a server.

It is noted that satellite systems may include any Global Navigation Satellite Systems (GNSS) like GPS, GLONASS, Galileo, and Compass/Beidou.

Certain aspects disclosed herein relate to positioning modules that estimate the positions of receivers—e.g., where the position is represented in terms of: latitude, longitude, and/or altitude coordinates; x, y, and/or z coordinates; angular coordinates; or other representations. Positioning modules use various techniques to estimate the position of a receiver, including trilateration, which is the process of using geometry to estimate the position of a receiver using distances traveled by different ranging signals (also referred to as "positioning" signals) that are received by the receiver from different beacons (e.g., terrestrial transmitters and/or satellites). If position information like the transmission time and reception time of a ranging signal from a beacon are known, then the difference between those times multiplied by speed of light would provide an estimate of the distance traveled by that ranging signal from that beacon to the receiver. Different estimated distances corresponding to different ranging signals from different beacons can be used along with position information like the locations of those beacons to estimate the position of the receiver. Positioning systems and methods that estimate a position of a receiver (in terms of latitude, longitude and/or altitude) based on ranging signals from beacons (e.g., transmitters, and/or satellites) and/or atmospheric measurements are described in co-assigned U.S. Pat. No. 8,130,141, issued Mar. 6, 2012, and U.S. Patent Application Publication No. US 2012/0182180, published Jul. 19, 2012.

The invention claimed is:

1. A method for reducing power consumption of a receiver in association with estimating a position of the receiver using terrestrial signals, the method comprising:
   determining power reduction strategy information;
   identifying a power reduction strategy using the determined power reduction strategy information; and
   placing one or more modules of the receiver into a reduced power state using the identified power reduction strategy,
   wherein identifying a power reduction strategy using the determined power reduction strategy information comprises:
      (a) determining a set of transmitters from which the receiver has received signals, wherein each of the transmitters in the set of transmitters transmitted a respective signal using a different TDMA transmission time slot; and
      (b) selecting, from the set of transmitters, a subset of transmitters that includes at least a threshold minimum number of transmitters, wherein selecting the subset of transmitters comprises:
         (i) identifying a first subset of transmitters that includes at least the threshold minimum number of transmitters and that transmitted a first subset of signals used to derive a first subset of range measurements that were used to compute a first estimated position of the receiver that meets a position quality threshold condition;
         (ii) identifying a second subset of transmitters that includes at least the threshold minimum number of transmitters and that transmitted a second subset of signals used to derive a second subset of range measurements that were used to compute a second estimated position of the receiver that meets the position quality threshold condition;
         (iii) selecting the first subset of transmitters as the selected subset of transmitters when a number of transmitters in the first subset of transmitters is less than a number of transmitters in the second subset of transmitters;
         (iv) selecting the second subset of transmitters as the selected subset of transmitters when the number of transmitters in the second subset of transmitters is less than the number of transmitters in the first subset of transmitters; and
         (v) selecting either the first subset of transmitters or the second subset of transmitters as the selected subset of transmitters when the number of transmitters in the first subset of transmitters is equal to the number of transmitters in the second subset of transmitters,
   wherein the identified power reduction strategy places a module of the one or more modules into the reduced power state during transmission time slots that are not used by any transmitter of the subset of transmitters.

2. The method of claim 1, wherein the one or more modules of the receiver are placed into the reduced power state by clock gating, power gating, or by turning off power to the one or more module.

3. The method of claim 1, wherein the threshold minimum number of transmitters is four transmitters.

4. The method of claim 1, wherein the transmission time slots that are not used by any transmitter of the subset of transmitters are not contiguous.

5. A method for reducing power consumption of a receiver in association with estimating a position of the receiver using terrestrial signals, the method comprising:
   determining power reduction strategy information;
   identifying a power reduction strategy using the determined power reduction strategy information; and
   placing one or more modules of the receiver into a reduced power state using the identified power reduction strategy,
   wherein identifying a power reduction strategy using the determined power reduction strategy information comprises:
      (a) determining a set of transmitters from which the receiver has received signals, wherein each of the transmitters in the set of transmitters transmitted a respective signal using a different TDMA transmission time slot; and
      (b) selecting, from the set of transmitters, a subset of transmitters that includes at least a threshold minimum number of transmitters, wherein selecting the subset of transmitters comprises:
         (i) identifying, from the set of transmitters, two or more subsets of transmitters that each provide less than a threshold value of dilution of precision; and
         (ii) selecting the subset of transmitters from the two or more subsets of transmitters,
   wherein the identified power reduction strategy places a module of the one or more modules into the reduced power state during transmission time slots that are not used by any transmitter of the subset of transmitters.

6. The method of claim 5, wherein the one or more modules of the receiver are placed into the reduced power state by clock gating, power gating, or by turning off power to the one or more module.

7. The method of claim 5, wherein the threshold minimum number of transmitters is four transmitters.

8. The method of claim 5, wherein the transmission time slots that are not used by any transmitter of the subset of transmitters are not contiguous.

9. One or more non-transitory machine-readable media embodying program instructions that, when executed by one or more machines, cause the one or more machines to implement a method for reducing power consumption of a receiver in association with estimating a position of the receiver using terrestrial signals, the method comprising
   determining power reduction strategy information;
   identifying a power reduction strategy using the determined power reduction strategy information; and
   placing one or more modules of the receiver into a reduced power state using the identified power reduction strategy,
   wherein identifying a power reduction strategy using the determined power reduction strategy information comprises:
      (a) determining a set of transmitters from which the receiver has received signals, wherein each of the transmitters in the set of transmitters transmitted a respective signal using a different TDMA transmission time slot; and
      (b) selecting, from the set of transmitters, a subset of transmitters that includes at least a threshold minimum number of transmitters, wherein selecting the subset of transmitters comprises:
         (i) identifying a first subset of transmitters that includes at least the threshold minimum number of transmitters and that transmitted a first subset of signals used to derive a first subset of range measurements that were used to compute a first estimated position of the receiver that meets a position quality threshold condition;
         (ii) identifying a second subset of transmitters that includes at least the threshold minimum number of transmitters and that transmitted a second subset of signals used to derive a second subset of range measurements that were used to compute a second estimated position of the receiver that meets the position quality threshold condition;
         (iii) selecting the first subset of transmitters as the selected subset of transmitters when a number of transmitters in the first subset of transmitters is less than a number of transmitters in the second subset of transmitters;
         (iv) selecting the second subset of transmitters as the selected subset of transmitters when the number of transmitters in the second subset of transmitters is less than the number of transmitters in the first subset of transmitters; and
         (v) selecting either the first subset of transmitters or the second subset of transmitters as the selected subset of transmitters when the number of transmitters in the first subset of transmitters is equal to the number of transmitters in the second subset of transmitters,
   wherein the identified power reduction strategy places a module of the one or more modules into the reduced power state during transmission time slots that are not used by any transmitter of the subset of transmitters.

10. The one or more non-transitory machine-readable media of claim 9, wherein the threshold minimum number of transmitters is four transmitters.

11. The one or more non-transitory machine-readable media of claim 9, wherein the transmission time slots that are not used by any transmitter of the subset of transmitters are not contiguous.

12. The one or more non-transitory machine-readable media of claim 9, wherein the one or more modules of the receiver are placed into the reduced power state by clock gating, power gating, or by turning off power to the one or more module.

13. One or more non-transitory machine-readable media embodying program instructions that, when executed by one or more machines, cause the one or more machines to implement a method for reducing power consumption of a receiver in association with estimating a position of the receiver using terrestrial signals, the method comprising
   determining power reduction strategy information;
   identifying a power reduction strategy using the determined power reduction strategy information; and
   placing one or more modules of the receiver into a reduced power state using the identified power reduction strategy,
   wherein identifying a power reduction strategy using the determined power reduction strategy information comprises:
      (a) determining a set of transmitters from which the receiver has received signals, wherein each of the transmitters in the set of transmitters transmitted a respective signal using a different TDMA transmission time slot; and (b) selecting, from the set of transmitters, a subset of transmitters that includes at least a threshold minimum number of transmitters, wherein selecting the subset of transmitters comprises:
  (i) identifying, from the set of transmitters, two or more subsets of transmitters that each provide less than a threshold value of dilution of precision; and
  (ii) selecting the subset of transmitters from the two or more subsets of transmitters, wherein the identified power reduction strategy places a module of the one or more modules into the reduced power state during transmission time slots that are not used by any transmitter of the subset of transmitters.

14. The one or more non-transitory machine-readable media of claim 13, wherein the threshold minimum number of transmitters is four transmitters.

15. The one or more non-transitory machine-readable media of claim 13, wherein the transmission time slots that are not used by any transmitter of the subset of transmitters are not contiguous.

16. The one or more non-transitory machine-readable media of claim 13, wherein the one or more modules of the receiver are placed into the reduced power state by clock gating, power gating, or by turning off power to the one or more module.

* * * * *